US007941281B2

(12) United States Patent
Rai et al.

(10) Patent No.: US 7,941,281 B2
(45) Date of Patent: May 10, 2011

(54) SYSTEM AND METHOD FOR ROTOR BLADE HEALTH MONITORING

(75) Inventors: Sudhanshu Rai, Bangalore (IN); Vinay Bhaskar Jammu, Bangalore (IN); Vivek Venugopal Badami, Schenectady, NY (US); Achalesh Kumar Pandey, Udham Singh Nagar (IN); Rahul Srinivas Prabhu, Bangalore (IN); Ajay Kumar Behera, Bangalore (IN); Aninda Bhattacharya, Bangalore (IN); Venkatesh Rajagopalan, Bangalore (IN); Nidhi Naithani, Bangalore (IN)

(73) Assignee: General Electric Company, Niskayuna, NY (US)

( * ) Notice: Subject to any disclaimer, the term of this patent is extended or adjusted under 35 U.S.C. 154(b) by 116 days.

(21) Appl. No.: 12/340,777

(22) Filed: Dec. 22, 2008

(65) Prior Publication Data

US 2010/0161245 A1    Jun. 24, 2010

(51) Int. Cl.
*G01B 3/44* (2006.01)
*G01B 3/52* (2006.01)

(52) U.S. Cl. .......................................................... 702/34

(58) Field of Classification Search ...................... 702/34
See application file for complete search history.

(56) References Cited

U.S. PATENT DOCUMENTS

| | | | |
|---|---|---|---|
| 4,887,468 A * | 12/1989 | McKendree et al. | ........... 73/660 |
| 4,922,757 A | 5/1990 | Rozelle et al. | |
| 4,955,269 A | 9/1990 | Kendig et al. | |
| 4,967,153 A | 10/1990 | Langley | |
| 4,996,880 A | 3/1991 | Leon et al. | |
| 5,015,949 A | 5/1991 | Koch et al. | |
| 5,097,711 A * | 3/1992 | Rozelle et al. | ................... 73/660 |
| 5,206,816 A | 4/1993 | Hill et al. | |
| 5,211,539 A | 5/1993 | McCarty | |
| 5,511,426 A | 4/1996 | Clement et al. | |
| 5,736,643 A | 4/1998 | Böres et al. | |
| 5,761,956 A | 6/1998 | Beeson et al. | |
| 5,865,599 A | 2/1999 | Pruden et al. | |
| 6,195,982 B1 * | 3/2001 | Gysling et al. | ................... 60/204 |
| 6,445,995 B1 | 9/2002 | Mollmann | |
| 6,594,619 B1 * | 7/2003 | von Flotow | ................... 702/184 |
| 6,729,186 B1 | 5/2004 | Sirrine et al. | |

(Continued)

FOREIGN PATENT DOCUMENTS

GB    2416848 A    2/2006

(Continued)

OTHER PUBLICATIONS

Watson, Matt; Sheldon, Jeremy; Amin, Sanket; Lee, Hyungdae; Byington, Carl; Begin, Michael; "A comprehensive high frequency vibration monitoring system for incipient fault detection and isolation of gears, bearings and shafts/couplings in turbine engines and accessories"; Proceedings of the ASME Turbo Expo, v 5, Proceedings of the ASME Turbo Expo 2007—Power for Land, Sea, and Air, 2007, p. 885-894.

(Continued)

*Primary Examiner* — Cindy Hien-Dieu Khuu
(74) *Attorney, Agent, or Firm* — Ann M. Agosti

(57) ABSTRACT

A system for rotor blade health monitoring include time of arrival (TOA) sensors and a controller comprising a processor configured for obtaining TOA signals indicative of times of arrival of rotating rotor blades from the respective TOA sensors and for determining initial features from the TOA signals; and a feature level fuser configured for fusing the initial features received from the processor for use in evaluating health of the rotating rotor blades.

11 Claims, 5 Drawing Sheets

U.S. PATENT DOCUMENTS

| | | |
|---|---|---|
| 6,755,617 B2 | 6/2004 | Escuret et al. |
| 6,768,938 B2 | 7/2004 | McBrien et al. |
| 6,927,567 B1 | 8/2005 | Roeseler et al. |
| 7,027,953 B2 | 4/2006 | Klein |
| 2002/0046006 A1 | 4/2002 | Qian et al. |
| 2002/0177979 A1 | 11/2002 | Andrew et al. |
| 2003/0060986 A1* | 3/2003 | Flotow .............................. 702/36 |
| 2003/0125890 A1 | 7/2003 | Nagamatsu |
| 2004/0060347 A1 | 4/2004 | Comperat et al. |
| 2005/0149290 A1 | 7/2005 | Barkhoudarian |
| 2005/0209814 A1 | 9/2005 | Song |
| 2005/0222747 A1 | 10/2005 | Vhora et al. |
| 2005/0240289 A1 | 10/2005 | Hoyte et al. |
| 2006/0000283 A1 | 1/2006 | Twerdochlib |
| 2006/0048581 A1 | 3/2006 | Bosselmann et al. |
| 2006/0078193 A1 | 4/2006 | Brummel et al. |
| 2006/0171806 A1 | 8/2006 | Twerdochlib |
| 2006/0267594 A1 | 11/2006 | Thompson |
| 2007/0043497 A1* | 2/2007 | Leogrande et al. ........... 701/100 |
| 2007/0132461 A1 | 6/2007 | Holmquist et al. |
| 2007/0271023 A1* | 11/2007 | Morris et al. ................. 701/100 |
| 2008/0206057 A1* | 8/2008 | Twerdochlib ................. 416/190 |
| 2009/0301055 A1* | 12/2009 | Kallappa .................... 60/39.091 |
| 2010/0114502 A1* | 5/2010 | Badami et al. ................. 702/35 |

FOREIGN PATENT DOCUMENTS

| | | |
|---|---|---|
| WO | 9920992 A2 | 4/1999 |
| WO | 2007071912 A2 | 6/2007 |

OTHER PUBLICATIONS

Vivek V. Badami, et al.; "System and Method for Article Monitoring"; Pending U.S. Appl. No. 12/262,783, filed Oct. 31, 2008; 18 Pages.

* cited by examiner

SYSTEM AND METHOD FOR ROTOR BLADE HEALTH MONITORING

BACKGROUND

The invention relates generally to systems and methods for monitoring health of rotor blades.

Rotor blades or rotating blades are used in many devices with several examples including compressors, turbines, and engines. An axial compressor, for example, has a series of stages with each stage comprising a row of rotor blades followed by a row of stator blades.

Axial compressors are used in a number of devices with one example being land based gas turbines. Land based gas turbines typically include an inlet section to accelerate the air, a compressor to compress the incoming air, a combustor for burning compressed air and fuel, and a turbine to covert thermal energy into mechanical energy to drive a generator to produce required power. To develop adequate pressure for combustion, the compressor has about eighteen stages with each stage having stator and rotor blades. Each blade of the compressor has distinct natural frequencies.

Various factors adversely affect health of the rotor blades and lead to fatigue, stress, and ultimately cracking of the rotor blades. When a rotor blade crack propagates and reaches a critical limit, the rotor blade is broken away from the rotor.

Thus, it is beneficial to predict health of the rotor blades in real time. By predicting cracks in real time, for example, failures of the devices in which the blades operate can be reduced.

BRIEF DESCRIPTION

In accordance with one embodiment of the present invention a system for monitoring health of rotating rotor blades is provided. The system include time of arrival (TOA) sensors, and a controller. The controller includes a processor configured for obtaining TOA signals indicative of times of arrival of rotating rotor blades from the respective TOA sensors and for determining initial features from the TOA signals; and a feature level fuser configured for fusing the initial features received from the processor for use in evaluating health of the rotating rotor blades.

In accordance with another embodiment of the invention, a system for monitoring health of rotor blades includes time of arrival (TOA) sensors and a controller. The controller includes a sensor level fuser configured for obtaining TOA signals indicative of times of arrival of the rotating rotor blades and fusing the TOAs signals for obtaining combined features; and a processor configured for fusing times of arrival signals obtained from the time of arrival sensors and the combined features from the sensor level fuser for use in evaluating health of the rotating rotor blades.

In accordance with still another embodiment of the invention, a system includes time of arrival (TOA) sensors and a controller. The controller includes a processor for obtaining TOA signals indicative of times of arrival of rotating rotor blades from the respective TOA sensors and for determining, from the TOA signals, initial features for use in evaluating the health of the rotating rotor blades, a sensor level fuser for obtaining combined features by fusing data obtained from the TOA sensors, a feature level fuser for fusing the times of arrival signals from the time of arrival sensors and the combined features, a physics modeler for receiving the initial features from the processor and estimating data regarding rotor blade crack length and rotor blade crack propagation time, a reliability modeler for estimating data regarding probability of the rotor blade crack, and a decision level fuser for fusing data received from the feature level fuser, the physics modeler, and the reliability modeler, for determining the health of the rotating rotor blades from the fused data.

In still another embodiment of the invention, a method for monitoring health of rotating rotor blades is disclosed. The method includes determining a time of arrival (TOA) and operational parameters of rotating rotor blades; determining a delta TOA using the TOA and a predetermined TOA; determining a corrected delta TOA by normalizing the delta TOA for variations in the operational parameters of the rotating rotor blades; obtaining initial features from the corrected delta TOA; and obtaining crack length and crack propagation time of the rotating rotor blades by fusing the initial features and the operational parameters.

DRAWINGS

These and other features, aspects, and advantages of the present invention will become better understood when the following detailed description is read with reference to the accompanying drawings in which like characters represent like parts throughout the drawings, wherein:

FIG. 1 is a block diagram in accordance to one embodiment of the invention for monitoring health of rotor blades.

FIG. 2 graphically illustrates determination of actual TOAs for rotating blades and a model-based approach to determine expected TOAs from a number of actual TOAs in accordance with one embodiment of the invention.

DETAILED DESCRIPTION

Figure 1:
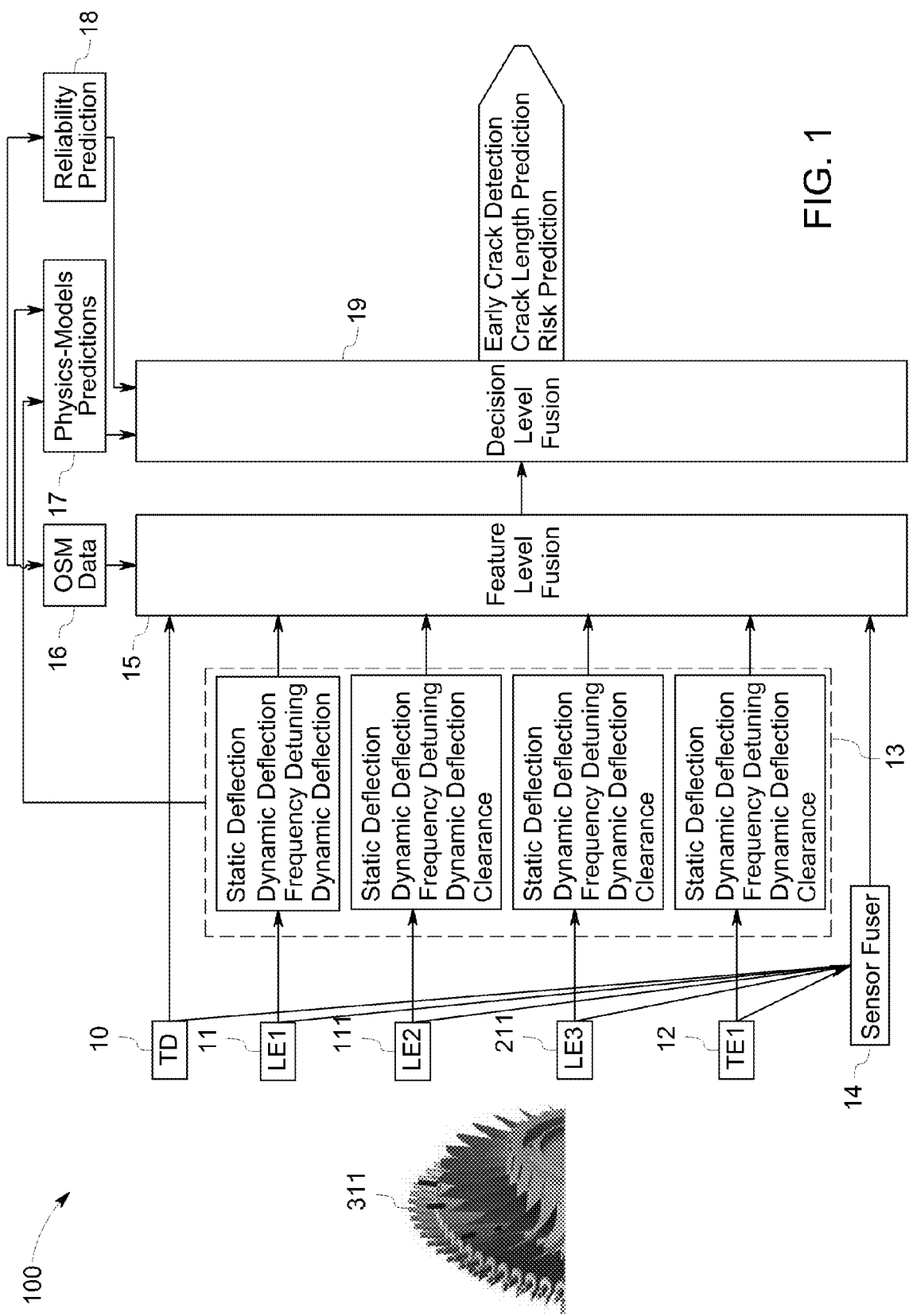

FIG. 1 is a block diagram of a system 100 in accordance with one embodiment of the invention for monitoring health of rotor blades 311. The system 100 includes at least one sensor 11, 12 for sensing arrival of the rotor blade 311 with respect to a reference key phasor. In the illustrated embodiment, two types of sensors are shown including leading edge sensor (LE) 11 and trailing edge sensor (TE) 12. In the block diagram, the system includes three leading edge sensors (LE1, LE2 and LE3) 11, 111, 211 and one trailing edge sensor (TE) 12. However, the number of each type of sensor depends on a variety of factors including, for example, the number of stages of rotor blades 311 and the number of rotor blades 311 in the stages.

In one aspect of the invention, all sensors can interchangeably be used as leading edge and trailing edge sensors. The leading edge sensors sense the arrival of a leading edge of the rotor blades 311 whereas the trailing edge sensors sense the arrival of a trailing edge of the rotor blades 311. The leading edge and trailing edge sensors may be of similar or different types and have been named differently merely due to their different functionalities in the illustrated embodiment. In one aspect of the invention, capacitive, eddy current and magnetic sensors are used as leading edge and trailing edge sensors.

The sensors (LE, TE) are mounted adjacent to the rotor blades on a stationary object in a position such that arrival of the rotor blades 311 can be sensed efficiently. In one embodiment of the invention, at least one sensor is mounted on a casing of the rotor blades 311. The leading edge sensors 11 and trailing edge sensor 12 sense arrival of at least one rotor blade 311 by taking a key phasor as a reference for determination of completion of each revolution of the rotor blades 311 and sending signals to a processor 13

A key phasor may comprise, for example, a proximity switch used to identify the beginning and completion of each revolution of the rotor blades 311. The operation of a key phasor is well known to those skilled in the art and is discussed in greater detail in THE KEYPHASOR—A Necessity For Machinery Diagnosis, Bentley Nev., November, 1977.

The system 100 may also include one or more transient detectors TD 10 for detecting transient conditions of the rotor blades 311 or of a device wherein the rotor blades 311 are installed. In one embodiment the transient detectors TD 10 are mounted anywhere at an optimal position of a rotor of the rotor blades 311 such that speed of the rotor can be measured. For example, the transient detector 10 may send signals during transient conditions such as start up and shut down of the rotor blades 311 to determine TOAs during the transient conditions. In one embodiment, start up of the rotor blades is declared when the rotor blades speed increase from 13% to 100%, and shut down of the rotor blades 311 is declared when speed of the rotor blades 311 decrease from 100% to 13%.

The processor 13 process the signals received from the sensors, determines TOAs of the rotor blades 311, and then determines delta TOAs from the TOA of the rotor blades 311 as described in detail below. A delta TOA can be defined as a difference between an expected TOA and an actual TOA. In one embodiment of the invention, the processor further determines a corrected delta TOA by using the delta TOA as well as information regarding operating conditions and load conditions of the rotor blades and/or the device wherein rotor blades 311 are installed. The delta TOA or corrected delta TOA of the rotor blades 311 is further processed by the processor to determine initial features for each sensor. The initial features may include, for example, features such as static deflection, dynamic deflection, clearance, blade twist profile, and frequency detuning. The frequency detuning is determined during transient conditions such as start up, shutdown, or speed sweep, and combinations thereof.

In one embodiment, at least some of the sensors and optionally the transient detector send signals to a sensor fuser 14 that fuses the signals and provides combined signals. In one embodiment, the sensor level fuser 14 uses the TOAs of the leading edge and trailing edge sensors of the rotor blades to determine blade twist in the rotor blades 311. The blade twist may be determined, for example, as a difference between the TOA signals sensed by the leading edge sensor and the trailing edge sensor. In still another embodiment, the combined signals determined by the sensor fuser include signals indicative of blade twist, static deflection, dynamic deflection, synchronous and/or asynchronous vibrations for all the sensors, or combinations thereof. Other sensor level fusion embodiments may include using one leading edge sensor to validate another leading edge sensor and to identify leading edge sensors that may have failed. For example if two or more leading edge sensor signals result in a static deflection value greater than a predefined value, then the health of the rotating rotor blades 311 needs to be monitored and an alarm may be raised. In another example, one leading edge sensor signal resulting in a static deflection greater than a predefined value and another leading edge sensor signal resulting in a static deflection less than a predefined value may indicate erroneous sensing by any one of the leading edge sensors.

The system 100 may include an onsite monitor OSM 16 (hereinafter 'OSM') for collecting operational data of the rotor blades 311. The operational data, for example, may include the load on the device having rotor blades 311, inlet guide vane (IGV) angle, fuel stroke ratio, speed of rotor blades 311, or combinations thereof. In one embodiment of the invention, the OSM determines operational features such as, for example, abnormal vibrations in the rotor blades 311, performance of a compressor including the rotor blades, stage efficiency, and temperature and pressure deviations.

In one embodiment, the combined features determined by sensor fuser 14, initial features determined by the processor 13, operational data from the onsite monitor 16, and signals from transient detector 10 are fused by a feature level fuser 15 to provide transitional data. The feature level fuser takes in to account state and load conditions of the system rotor blades 311 and/or a device comprising the rotor blades 311. The load on the rotor blades 311 and working state of the rotor blades 311 can be determined by using different methods, embodiments of which are described below. In one embodiment of the invention, the state or operating mode of the rotor blades 311 or the device wherein the rotor blades 311 are installed can be determined by an operating mode algorithm as described in detail with reference to FIG. 4.

The feature level fuser 15 determines state, load, and operational conditions of the rotor blades 311 as well as operating conditions of the sensors. With respect to the sensors, for example, when one sensor provides a signal indicative of static deflection, then the data of this sensor can be compared to data of other sensors to detect adequate operating conditions of the sensor. Also, accuracy of initial features and thereafter the sensors can be detected by comparing the initial features determined by the processor for different sensors. For example, when one of the sensors shows a shift in resonance frequency of one of the rotor blades 311, the feature level fuser 15 can relate the resonance frequency to static deflection and thus determine accuracy of the signals received from the sensors. In one embodiment of the invention, rule based methods are used to fuse one or more of the initial features, the combined features, the operational parameters, and the transitional data in the feature level fuser. In still another embodiment of the invention, statistical methods, such as for example, Bayesian methods, Demster methods, Demster-shafer methods, neural network methods, tree logic methods, and voting logic methods can be used for fusing the features in the feature level fuser 15.

In a further embodiment, the features determined by the feature level fuser 15 are then fused in a decision level fuser 19 with predictions or features determined by a physics model 17 and/or predictions or features determined by a reliability model 18.

The reliability model 18, for example, may be used to evaluate reliability of the predictions made by the processor, OSM, and feature level fuser by using one or more reliability models. In one embodiment of the invention, a function for determining health of the rotating rotor blade 311 is defined wherein the function is dependent on factors affecting the health of the rotating rotor blades 311. The factors affecting the health of rotating rotor blades may include, for example, number of starts and stops, hours of operation, inlet guide value angle, load on the rotating rotor blades 311, and other factors known to a person skilled in the art. In one embodiment, the function maps known health of rotating rotor blades for various combinations and sub combinations of the factors affecting the health of rotating rotor blades. The known heath of rotating rotor blade may include, for example, factors such as known cracks and lengths in the rotating rotor blade 311.

The mapping is then used to evaluate the predictions made by the processor 13, feature level fuser, and the OSM 16. In one embodiment, the reliability model also incorporates the initial features determined by the processor and the OSM for transient conditions.

In one embodiment of the invention, the physics model 17 make predictions of rotor blade vibrations by processing data received from the OSM 16 and/or the processor 13. In another embodiment, the physics model 17 make structural predictions about the rotor blades 311. The structural predictions, for example, include crack in the rotating rotor blade 311, length of the crack, and the crack propagation time. The structural predictions, for example, may include time left for a cracked blade to separate. The physics model 17, for example, may use methods including fracture mechanics models and/or finite element models. In one embodiment of the physics model 17, a health monitoring function is defined dependent on structural specifications of the rotating rotor blades 311. The structural specifications may include, for example, crack, blade geometry, type of rotating rotor blade, and material properties. In still another embodiment of the invention, relationships are developed between combinations of the initial features to determine health of the rotating rotor blades 311. For example, the relationship may include development between change in frequency of the rotating rotor blades 311 for specific vibration modes with respect to crack size.

The decision level fuser 19 provides confidence in the rotor blade health results achieved in sensor level fuser 14 and the feature level fuser 15. In one embodiment of the invention, rule based methods are used to fuse the features in the decision level fuser 19. In still another embodiment of the invention, statistical methods, such as for example, Bayesian methods, Demster methods, Demster-shafer methods, neural network methods, tree logic methods, and voting logic methods can be used for fusing the features in the decision level fuser 19. In one embodiment, the decision level fuser 19 determines cracks and predicts cracks and crack risk for the rotor blades 311. The risk prediction may also include the time span left for a cracked rotor blade 311 to separate.

Figure 2:
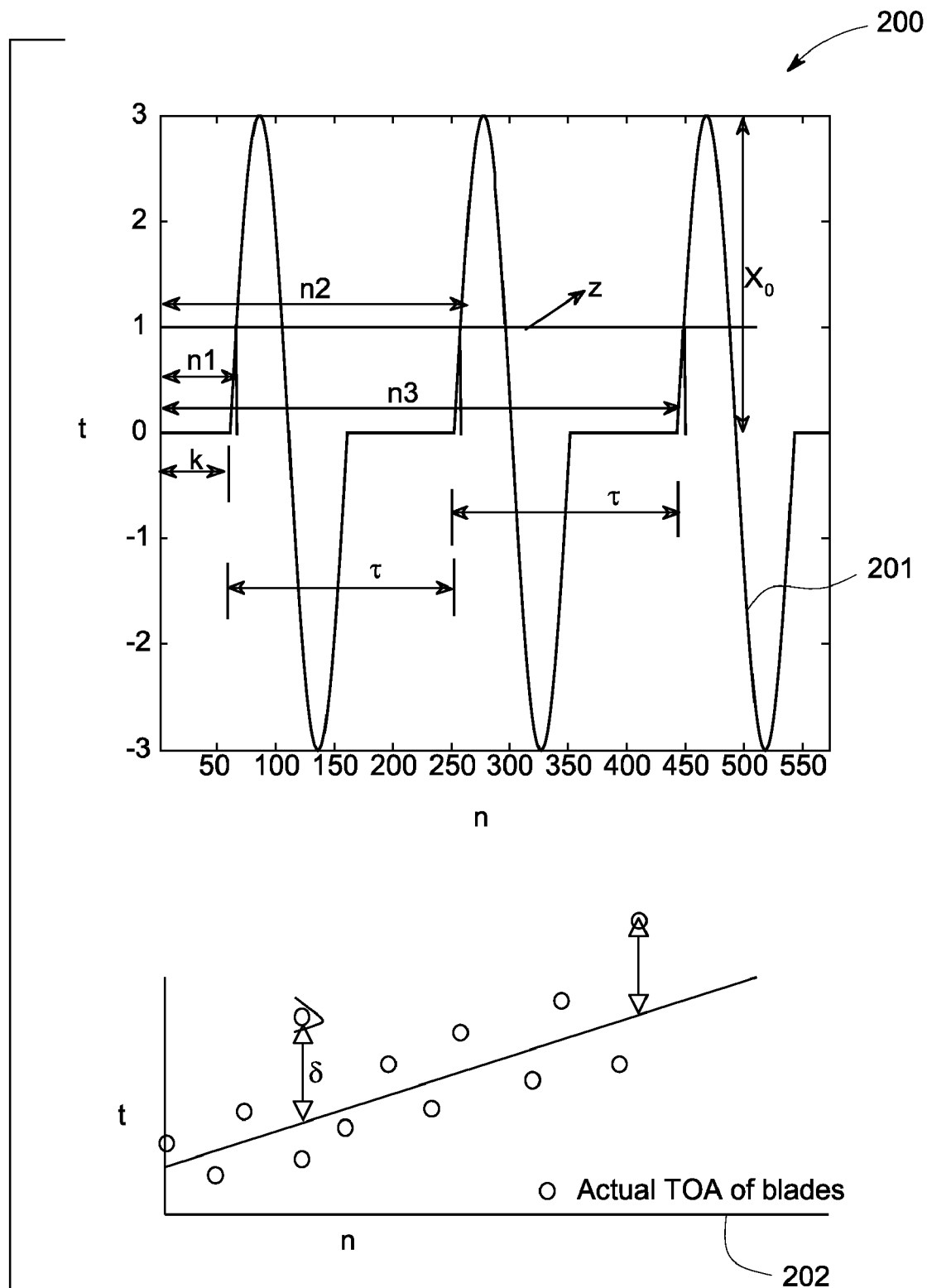

FIG. 2 illustrates determination of actual TOAs for the rotating rotor blades 311 and determination of expected TOAs from the actual TOAs. In one embodiment, the expected TOA is determined, by a model-based approach using a number of actual TOAs. In another embodiment, the expected TOA is determined by taking an average of actual TOAs of all the rotating rotor blades of the rotor. The actual TOAs for all the rotating rotor blades are determined by the sensing devices 11, 111, 211, 12 as illustrated with reference to FIG. 1.

Furthermore, determination of expected TOAs using the model based approach is illustrated. The actual and expected TOAs may be used by the processor 13. FIG. 2 shows a time domain plot 200 of simulated signals received from a sensor indicating arrival of the rotor blades 311, which is termed as Blade Passing Signal 201 (hereinafter BPS). The time domain has an x-axis representing the rotor blade numbers and a y-axis representing actual TOAs. The BPS 201 is a sine wave sampled for a particular time period and is used for determining actual TOA. Thus, the sine wave can be represented in terms of voltage V as follows:

$$V(k) = X_0 \sin(\omega k \Delta t) \quad \quad 1$$

wherein V is instantaneous voltage, $X_0$ is maximum amplitude, k is sample number, $\omega$ is frequency, and $\Delta t$ is sampling interval.

Each pulse on the BPS 201 denotes an arrival of the rotor blade 311. Each pulse is assumed to be a sine wave of fixed time period and frequency $\omega$, and $\Delta t$ is the sampling interval of the BPS. When voltage V is maintained at a constant threshold voltage z, then actual TOA represented as $TOAn_1$, $TOAn_2$, $TOAn_3$ ... $TOAn_m$ is detected as follows.

$$TOAn_m = (\tau(m-1) + \beta) \quad \quad 2$$

wherein $\delta_m$ is blade vibration feature and $\tau$ is blade spacing. In order to determine expected TOAs for the rotor blades, an expected TOA determination model (hereinafter 'model') equation 2 is used to determine the expected TOA. Such determination assumes that the rotor blades 311 work in an ideal situation, load conditions are optimal, and rotor blade vibrations are minimal.

In one embodiment of the invention, the model determines the expected TOA for each revolution and all possible speeds and load conditions of the rotating rotor blades 311. The determination of expected TOA at all possible loads and speeds for each revolution of the rotor blades results in accurate expected TOA for different operating conditions of the rotor blades. The model forms a graph 202 as shown in FIG. 2 wherein actual TOAs are plotted for different blade numbers. The graph 202 shows plotting of different blade numbers $n_1, n_2, n_3 \ldots n_m$ on X-axis against actual TOAs of the rotating rotor blades 311 on the Y-axis to determine the expected TOA. The expected TOA is determined from a least square fit plot of the actual TOA points on the graph. Thus, by using plots of the actual TOAs, expected TOAs can be represented in the form of a straight line equation as follows.

$$\text{Expected TOA} = \tau(m-1) + \beta \quad \quad (3)$$

wherein $\tau$ is interblade spacing and $\beta$ is constant offset. Thus, if $TOAn_m$ is an actual TOA of a rotor blade m in baseline working environment and good health, an expected delta TOA of a rotor blade m can the be determined as:

$$\text{Expected Delta TOA} = TOAn_m - (\tau(m-1) + \beta). \quad \quad (4)$$

Figure 3:
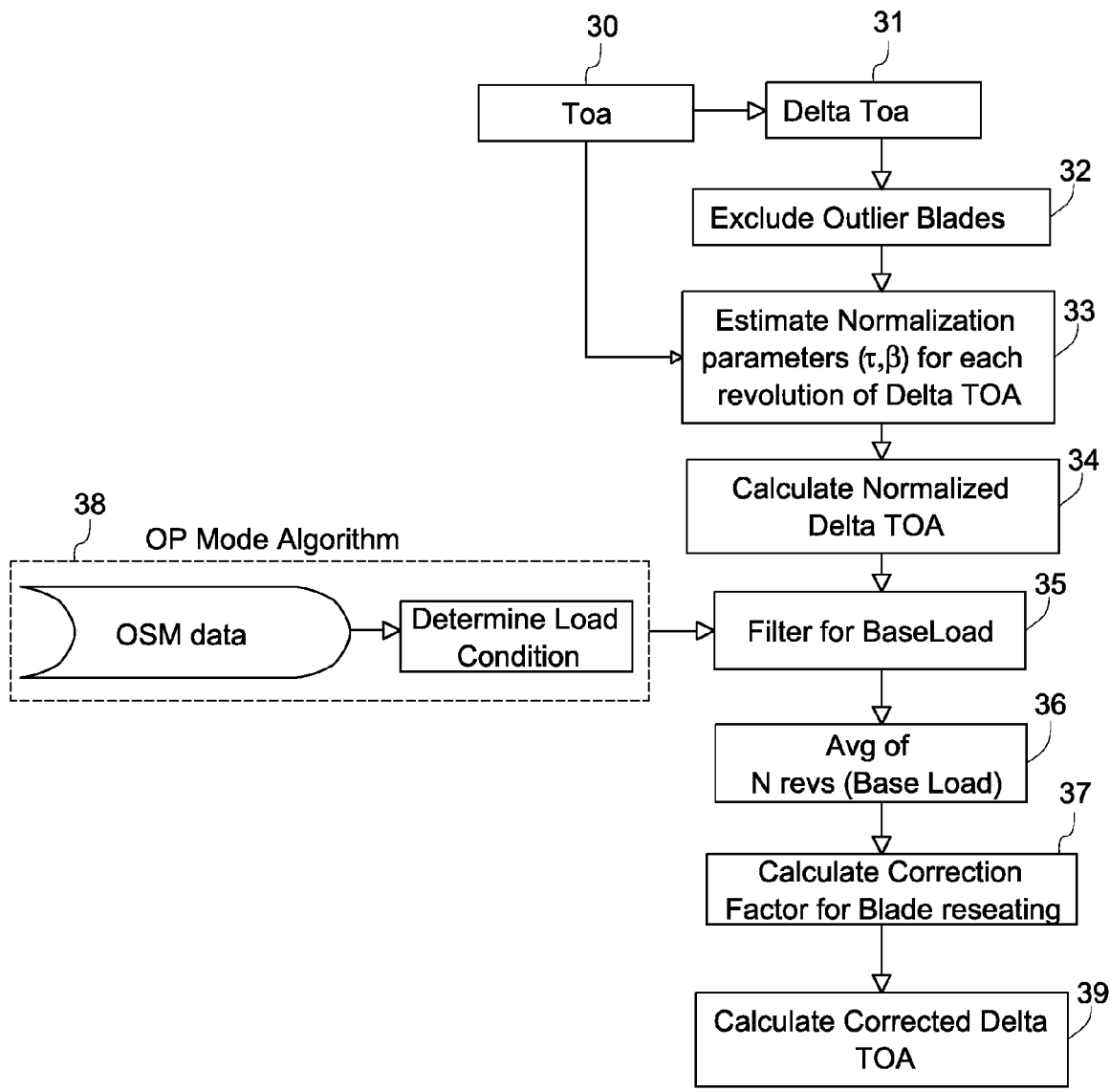
FIG. 3 is a block diagram illustrating determination of a corrected delta TOA in accordance with one embodiment of the invention.

FIG. 3 is a flow chart illustrating determination of a corrected delta TOA in accordance with one embodiment of the invention. Delta TOA as described in FIG. 2 can be influenced by variations in operational parameters such as, for example, load, IGV angle, and mass flow. Normalization of delta TOA normalizes delta TOA for load and operational variations and corrects the delta TOA for shifts due to blade reseating during starts. Use of the normalized delta TOA for determination of a corrected delta TOA results in more accurate determination of initial features and combined features as determined by processor 13 and sensor level fuser 14 of FIG. 1.

In step 30 actual TOA is determined for all the rotating rotor blades in real time by the sensors. The actual TOAs determined in step 30 are then used to determine delta TOAs in step 31 for all the rotor blades. In step 32 the rotor blades for which the actual TOAs are outside a predefined limit are excluded from the process of determination of corrected TOA. The rotor blades 311 that are out of the predefined limit may have rotor blade cracks or twists and thus may lead to erroneous determination of a corrected delta TOA. The selected actual TOAs are then modeled to determine values of $\tau$ and $\beta$. In one embodiment, the model plots a graph against selected rotor blades and corresponding actual TOAs. If actual TOAs of all the rotor blades fall within the predefined limit, then the line drawn in the graph using the actual TOAs can be represented as shown in equation (5). In the equation (5) $TOAn_m$ is actual TOA of the m blade. In step 33 a least square fit of the equation (5) is used to determine values of $\tau$ and $\beta$. Furthermore the delta TOA for a rotating rotor blade k is normalized. In one embodiment the delta TOA for the rotating rotor blade is normalized using values of τ and β in equation (6) in step 34.

$$\begin{pmatrix} TOA_{n1} \\ TOA_{n2} \\ TOA_{n3} \\ \ldots \\ TOAn_m \end{pmatrix} = \tau \begin{pmatrix} 0 \\ 1 \\ 2 \\ \ldots \\ \ldots \\ m-1 \end{pmatrix} + \beta \quad (5)$$

Normalized delta $TOA_k = TOAn_k - (\tau + (k-1)\beta)$ \quad (6)

In another embodiment, the delta TOA of the rotating rotor blade 311 is normalized by subtracting a normalization offset from the delta TOA. The normalization offset is the average of delta TOAs of all the rotating rotor blades excluding the rotating rotor blades that show extreme delta TOA values. For instance, 10% of the rotating rotor blades that exhibit the extreme (high and low) delta TOA values are exempted from the calculation of normalization offset. In step 35 baseload conditions are filtered from all the load conditions on the rotor blades. The load conditions are taken from operational mode block 38 that determines load on the rotor blades or load on the device where rotor blades are used. Thus, expected normalized delta TOA is determined by taking average of the delta TOA for n revolutions of the rotor blades at the baseline that results in expected normalized delta TOA at the baseload in step 36. The expected normalized delta TOA determined in step 36 and normalized delta TOA determined in step 34 are then used to determine correction factor in step 37. The rotor blade correction factor $C_k$ may be determined by using the following equation:

$C_k$=Expected Normalized delta TOA−Normalized delta TOA$_k$ \quad (7)

The correction factor $C_k$ determined in equation (7) is subtracted from each revolution of Normalized delta TOA to obtain the Corrected delta TOA at step 39.

Figure 4:
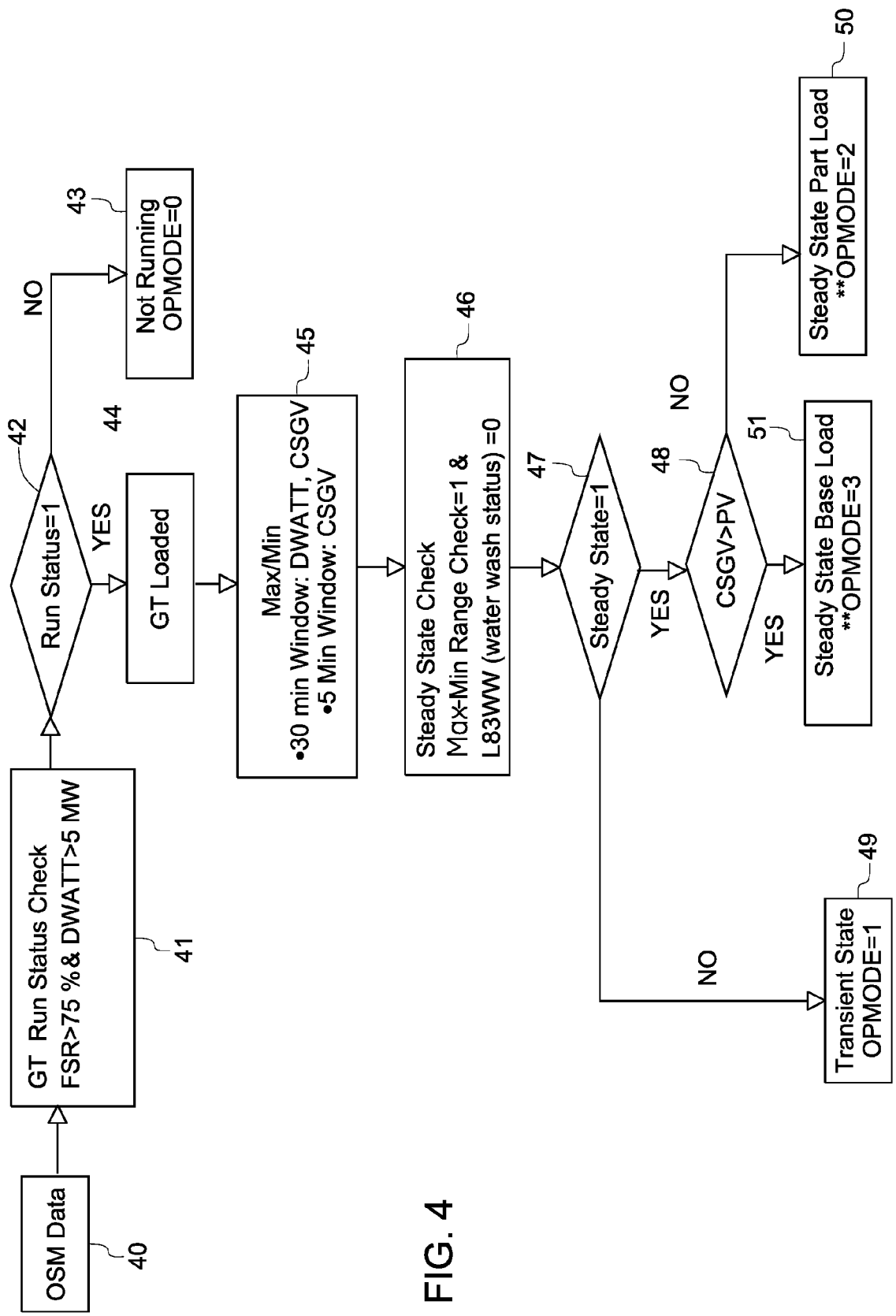
FIG. 4 is a flowchart for determination of an operational mode in a gas turbine in accordance with one embodiment of the invention.

FIG. 4 is a flowchart for determination of an operational mode in a gas turbine in accordance to one embodiment of the invention. In determination of the operational mode, operational parameters are utilized to classify the operating status of the gas turbine. In step 40 operational data (as illustrated with reference to FIG. 1) from the onsite monitor OSM is received to check running status of the gas turbine in step 41. In step 41 the operational parameters, for example, Fuel Stroke Reference (FSR), Load (DWATT), and Compressor Suction Guide Vane Angle (CSGV) are determined. In step 42 determination is made regarding load on the gas turbine using the operational mode parameters. In one embodiment of the invention when FSR>75% and DWATT>5 Mega Watt (MW), then the Gas Turbine is stated to be loaded. Thus, if the running status is determined to be loaded in step 42, the process moves to step 44 else to step 43. In step 43 operational mode OPMODE is equalized to zero indicating no load or minimal load on the Gas Turbine. When the gas turbine is determined to be loaded in step 44, the load is further classified into three modes depending on the load, CSGV, and water wash status. In step 45 maximum minimum spreads of DWATT and CSGV are determined for thirty minutes and maximum minimum spread of CSGV is determined for five minutes. On the basis of the maximum minimum spread of DWATT and CSGV done in step 45, determination of the state of the gas turbine is done in step 46. In one embodiment of the invention, the gas turbine is declared to be in steady state in step 46 if the following four conditions are satisfied: 1. The maximum range of load (Max-Min) over the last 30 minutes is less than 5 MW. 2. The maximum range of CSGV (Max-Min) over the last 30 minutes is less than 3 degrees. 3. The maximum range of CSGV (Max-Min) over the last 5 minutes is less than 0.5 degrees. 4. No water washes in the last 30 minutes.

The steady state conditions may vary depending upon the type of device in which the rotor blades are used. When all the abovementioned conditions are not satisfied, then the status of the gas turbine is classified as Transient (OPMODE=1) in step 49. When all the abovementioned conditions are satisfied, then the gas turbine is determined to be working in steady state, and the operating mode is further classified in two modes including base load and part load. In one embodiment of the invention for determination of base load and part load, CSGV is determined in step 48. When the CSGV is greater than a predetermined value (PV) then status of the gas turbine is determined as steady state base load in step 51 else is determined as part load in step 50.

Figure 5:
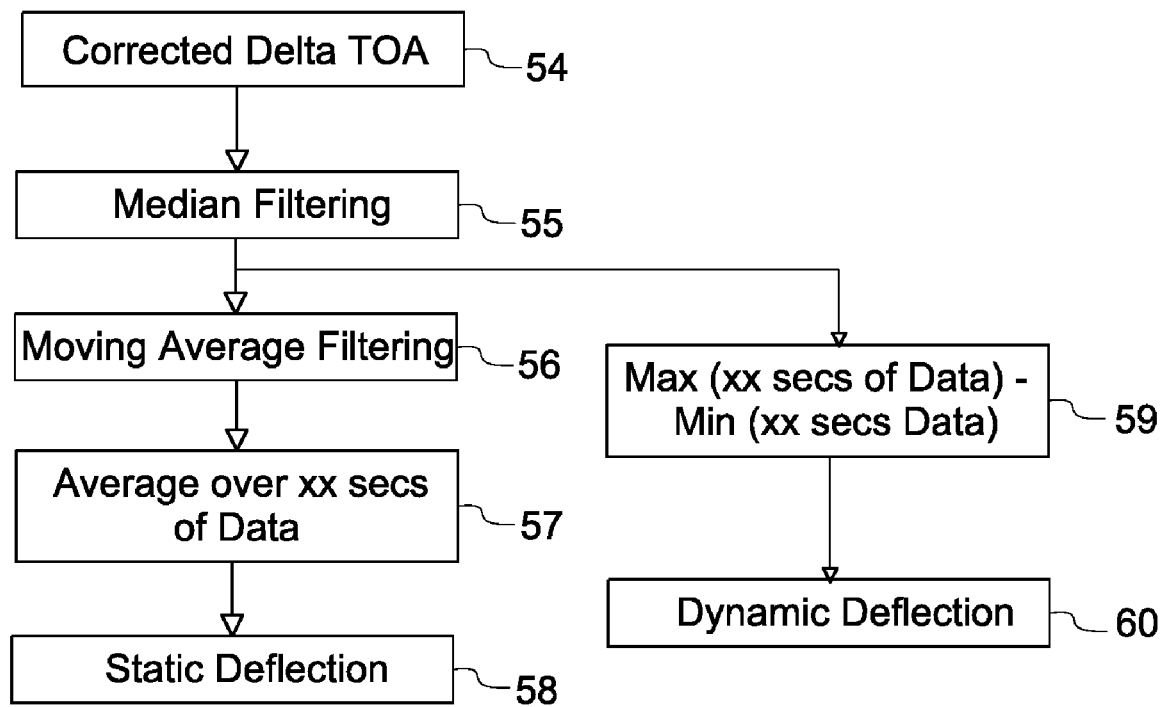
FIG. 5 is a flow chart of determination of static and dynamic deflection from corrected delta TOA in the rotor blades in accordance with one embodiment of the invention.

FIG. 5 illustrates a flow chart for determination of static and dynamic deflection from corrected delta TOA in the rotor blades in accordance to one embodiment of the invention. In step 54 the corrected delta TOA is determined as discussed in detail with respect to FIG. 3. In step 55 the corrected delta TOA is median filtered, followed by average filtering in step 56. The average filtered data of step 56 is then averaged at step 57 for a predetermined amount of time to obtain static deflection at step 58.

For determination of dynamic deflection, maximum and minimum values of median filtered data is determined for a predetermined amount of time in step 59. The difference between the maximum and minimum over every 180 seconds results in determination of dynamic deflection in step 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   time of arrival (TOA) sensors; and
   a controller comprising
   a sensor level fuser configured for obtaining TOA signals from one or more of the TOA sensors, wherein the TOA signals are indicative of times of arrival of rotating rotor blades and fusing the TOA signals for obtaining combined features;
   a processor configured for obtaining TOA signals from the respective TOA sensors and for determining initial features from the TOA signals; and
   a feature level fuser configured for fusing the initial features, the combined features, and operational parameters of the rotating rotor blades for use in evaluating the health of the rotating rotor blades.

2. The system of claim 1 wherein the TOA sensors comprise leading edge sensors, trailing edge sensors or combinations thereof.

3. The system of claim 1 wherein the initial features comprise static deflection, dynamic deflection, clearance, blades twist profile, frequency detuning during transient operation, or any combination thereof.

4. The system of claim 1 wherein the processor is further configured to determine a delta TOA using the TOA and an expected TOA, determine a corrected delta TOA by normalizing the delta TOA for variations in the operational parameters of the rotating rotor blades, and determine the initial features using the corrected delta TOA.

5. A system comprising:
time of arrival (TOA) sensors; and
a controller comprising
  a processor for obtaining TOA signals indicative of times of arrival of rotating rotor blades from the respective TOA sensors and for determining, from the TOA signals, initial features for use in evaluating the health of the rotating rotor blades;
  a sensor level fuser for obtaining combined features by fusing data obtained from the TOA sensors,
  a feature level fuser for fusing the times of arrival signals from the time of arrival sensors and the combined features,
  a physics modeler for receiving the initial features from the processor and estimating data regarding rotor blade crack length and rotor blade crack propagation time,
  a reliability modeler for estimating data regarding probability of the rotor blade crack, and
  a decision level fuser for fusing data received from the feature level fuser, the physics modeler, and the reliability modeler, for determining the health of the rotating rotor blades from the fused data.

6. The system of claim 5 wherein the controller further comprises:
an onsite monitor for determining operational parameters data of the rotating rotor blades and providing the operational parameters data to the feature level fuser and the physics modeler.

7. The system of claim 6 wherein the physics modeler is further configured to receive the operational parameters from the onsite monitor for estimating data regarding rotor blade crack length and rotor blade crack propagation time.

8. The system of claim 6 wherein the rotor blades are housed in a compressor of a gas turbine, and wherein the onsite monitor is configured to determine at least one of a load on gas turbine, inlet guide vane angle, fuel stroke ratio, speed of the rotor blades, abnormal vibration in the rotor blades, performance of the compressor stage efficiency, temperature deviation, and pressure deviation.

9. A method comprising:
using sensors for determining a time of arrival (TOA) of rotating rotor blades;
using an onsite monitor for determining operational parameters of the rotating rotor blades; and
using a processor for determining a delta TOA using the TOA and an expected TOA; determining a corrected delta TOA by normalizing the delta TOA for variations in the operational parameters of the rotating rotor blades; obtaining initial features by processing the corrected delta TOA; and obtaining crack length and crack propagation time of the rotating rotor blades by fusing the initial features and the operational parameters by a physics model.

10. The method of claim 9 wherein the expected TOA is determined by the processor using multiple TOAs of the rotating blades operating in baseline conditions.

11. The method of claim 9 further comprising:
using the processor for determining TOAs for the rotating rotor blade and fusing the TOAs to determine a fused TOA;
using the processor for determining combined features of the rotating rotor blades using the TOAs and the fused TOA;
wherein the combined features are fused with the initial features for determination of health of the rotating rotor blades.

* * * * *